United States Patent
Wada

(10) Patent No.: US 8,631,413 B2
(45) Date of Patent: Jan. 14, 2014

(54) DETERMINING THE TERMINATION PRIORITY OF APPLICATIONS BASED ON CAPABILITY OF APPLICATIONS TO RETAIN OPERATION STATE INFORMATION

(75) Inventor: Yuki Wada, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 598 days.

(21) Appl. No.: 12/524,717

(22) PCT Filed: Jan. 28, 2008

(86) PCT No.: PCT/JP2008/051163
§ 371 (c)(1),
(2), (4) Date: Nov. 10, 2009

(87) PCT Pub. No.: WO2008/091008
PCT Pub. Date: Jul. 31, 2008

(65) Prior Publication Data
US 2010/0122257 A1    May 13, 2010

(30) Foreign Application Priority Data

Jan. 26, 2007  (JP) ................................. 2007-016322
Jan. 29, 2007  (JP) ................................. 2007-018081

(51) Int. Cl.
G06F 9/44 (2006.01)
G06F 9/48 (2006.01)
G06F 9/50 (2006.01)

(52) U.S. Cl.
USPC ............................ 718/103; 718/100; 718/102

(58) Field of Classification Search
None
See application file for complete search history.

(56) References Cited

U.S. PATENT DOCUMENTS

| 6,910,210 B1 * | 6/2005 | Chew | 718/103 |
| 6,981,040 B1 * | 12/2005 | Konig et al. | 709/224 |
| 2005/0034129 A1 * | 2/2005 | Chew | 718/100 |
| 2005/0044205 A1 * | 2/2005 | Sankaranarayan et al. | 709/223 |
| 2005/0138448 A1 * | 6/2005 | Chew | 713/300 |
| 2005/0177832 A1 * | 8/2005 | Chew | 718/104 |
| 2005/0255817 A1 * | 11/2005 | Edeler | 455/161.1 |
| 2007/0070038 A1 * | 3/2007 | Hoffberg et al. | 345/156 |
| 2007/0098004 A1 * | 5/2007 | Lada | 370/437 |

(Continued)

FOREIGN PATENT DOCUMENTS

| JP | 63-200257 | 8/1988 |
| JP | 3-253965 | 11/1991 |

(Continued)

OTHER PUBLICATIONS

Kawamura et al., "Quick Operating Fun PC Settings" ASCII Dot PC, ASCII, Mar. 1, 2003 vol. 6, No. 3, pp. 32-49.

(Continued)

*Primary Examiner* — Jennifer To
*Assistant Examiner* — Benjamin Wu
(74) *Attorney, Agent, or Firm* — Duane Morris LLP

(57) ABSTRACT

When a request is made for execution of a new application while other application is being executed or interrupted, and a judgment unit (61) has judged that no memory capacity required for execution of the new application is available in a volatile memory (12), an execution unit (2) terminates the other application having the lowest priority among the applications being executed or interrupted according to the priority of the priority information in a nonvolatile memory (11), and executes the new application.

19 Claims, 5 Drawing Sheets

(56) References Cited

U.S. PATENT DOCUMENTS

| | | | |
|---|---|---|---|
| 2007/0112973 A1* | 5/2007 | Harris et al. | 709/232 |
| 2008/0046142 A1* | 2/2008 | Jordan et al. | 701/36 |
| 2010/0037230 A1* | 2/2010 | Potonniee et al. | 718/103 |

FOREIGN PATENT DOCUMENTS

| | | |
|---|---|---|
| JP | 6-75774 | 3/1994 |
| JP | 10-63567 | 3/1998 |
| JP | 2000-293386 | 10/2000 |
| JP | 2001-306437 | 11/2001 |
| JP | 2003015892 | 1/2003 |
| JP | 2004-110731 | 4/2004 |
| JP | 2005-301801 | 10/2005 |
| JP | 2006-059340 | 3/2006 |

OTHER PUBLICATIONS

Madoka, "Tomorrow is Tomorrow's Windows, Me/XP, Q&A, 106th Session, Efficient and Quick Execution", PC Fan, Mainichi Communications, Jul. 1, 2003, vol. 10, No. 16, pp. 104-105.

Japanese Office Action from Japanese Patent Application No. 2007-016322, mailed on Apr. 6, 2010, 11 pages.

International Search Report for PCT/JP2008/051163, mailed May 1, 2008, 4 pages.

Final Japanese Office Action from Japanese Patent Application No. 2007-016322, mailed on Jul. 13, 2010.

Notice of Reasons for Rejection for Japanese Patent Application No. 2007-018081, mailed Jan. 10, 2012, 7 pages (including English translation).

* cited by examiner (a)            (b)

DETERMINING THE TERMINATION PRIORITY OF APPLICATIONS BASED ON CAPABILITY OF APPLICATIONS TO RETAIN OPERATION STATE INFORMATION

This application is a U.S. National Phase Application of International Application No. PCT/JP2008/051163 filed Jan. 28, 2008, which claims priority to Japanese Application Nos. 2007-016322 filed Jan. 26, 2007 and 2007-018081 filed Jan. 29, 2007, the disclosures of which are incorporated herein in their entirety.

TECHNICAL FIELD

The present invention relates to an electronic device capable of execution of a plurality of applications and a control method in an electronic device.

BACKGROUND ART

In recent years, mobile phones and other electronic devices have become capable of execution of a variety of applications.

As applications executable by an electronic device, there are, for example, e-mail, a calendar, an address book, a web browser, navigation by a map or GPS, playback of music, and games.

Further, there is an electronic device temporarily interrupting an application being executed at present to make it stand by and executing another application during this period.

In such an electronic device, making the interrupted application stand-by, and another application is executed during the interruption, then, the interrupted application again in a state immediately before the interruption when the another application terminates, to thereby improve the usage of the electronic device.

However, when interrupting the application being executed and making the application stand by for newly executing another application, depending on the amount of memory used by the application to be newly executed, the total amount of memory used by the application during standby and the amount of memory used by the application to be newly executed sometimes exceeds the maximum value of a memory capacity of a mobile terminal. In this case, it suffers from the disadvantage that a new application no longer could be executed. In particular, such disadvantage is remarkable in a mobile terminal capable of executing a new application, in a state where a plurality of applications are interrupted and making them stand-by.

As art overcoming such the disadvantage, there is known the art disclosed in, for example, Patent Document 1.

Patent Document 1: Japanese Patent Publication (A) No. 10-63567

DISCLOSURE OF THE INVENTION

Problem to be Solved by the Invention

Patent Document 1 discloses a method of display of memory shortage judging whether or not a memory capacity required for executing a new application exceeds a remaining memory capacity when executing of a new application is requested in a state where a plurality of applications are being executed, notifying whenever the remaining memory capacity is smaller than the memory capacity required for executing the new application, and displaying a state of memory usage of the applications being executed.

Namely, in the method of display of memory shortage disclosed in Patent Document 1, when the memory capacity is not large enough to execute the new application, a user must perform an operation such as looking at the display of the amount of memory used by each application being executed and terminating execution of an application which uses the largest memory capacity by a manual operation. Accordingly, in the method of display of memory shortage disclosed in Patent Document 1, the user cannot determine whether or not the memory capacity required for executing the new application will exceed the remaining memory capacity until requesting execution of the new application. This being so, until the user performed an operation requesting execution of the new application, the user could not determine if that application could be executed (if the application being executed was ended), so it suffers from the disadvantage that the operability is low.

In order to overcome the disadvantages explained above, an object of the present invention is to provide an electronic device improving the operability in a state where a plurality of applications can be executed, and a control method in such the electronic device.

Means for Solving the Problem

To attain the above object, an electronic device of a first aspect of the invention has a storage part for storing a plurality of applications to which orders of priority are assigned, an execution part executing an application requested to be executed among the plurality of applications stored in the storage part, and a control part controlling execution of the application at the execution part, wherein the control part terminates the execution of the application having the lowest priority, among the applications which being executed by the execution part, and makes to execute the application which is newly requested to be executed, when a new application among the plurality of applications is requested by the execution part to newly execute during any one of application among the plurality of applications is being executed by the execution part, and when a predetermined parameter would exceed a permissible value due to the execution of the application newly requested to be executed.

An electronic device of a second aspect of the invention has a storage part for storing a plurality of applications, an execution part executing an application requested to be executed among the plurality of applications stored in the storage part, and a control part controlling execution of the application at the execution part, wherein the control part terminates the execution of applications other than a specific application set to restrict terminating of the executing among the applications which have been executed by the execution part, and makes to execute the application which is newly requested to be executed, when executing of any application among the plurality of applications is newly requested when any application among the plurality of applications is being executed by the execution part, and when a predetermined parameter would exceed a permissible value due to the execution of the application newly requested to be executed.

A control method of a third aspect of the invention is a control method in an electronic device capable of executing a plurality of applications, including: a step of judging whether or not a predetermined parameter exceeds a permissible value due to an execution of a new application among the plurality of applications newly requested to be executed when the new application is newly requested to be executed during any application among the plurality of applications is being executed, and a step of terminating the execution of the application having the lowest priority among applications which have been executed, and making newly requested the application execute, when it is judged at the step of judgment that the predetermined parameter exceeds the permissible value due to the execution of the application newly requested to be executed.

A control method of a fourth aspect of the invention is a control method in an electronic device capable of executing a plurality of applications to which orders of priority are assigned, including: a step of judging whether or not a predetermined parameter exceeds a permissible value due to an execution of a new application newly requested to be executed when the new application among the plurality of applications is newly requested to be executed during any application among the plurality of applications is being executed, and a step of terminating the execution of applications other than a specific application set to restrict terminating of executing among the applications which have been executed and executing the application newly requested to be executed when it is judged at the step of judgment that the predetermined parameter exceeds the permissible value due to the execution of the application newly requested to be executed.

EXPLANATION OF NOTATIONS 100, 200 . . . mobile terminals, 101 . . . upper case, 102 . . . lower case, 103 . . . hinge part, 1, 1a . . . storage parts, 11, 11a . . . nonvolatile memories, 12 . . . volatile memory, 2, 2a . . . execution parts, 3 . . . display part, 4 . . . operation part, 5 . . . report part, 6, 6a . . . control parts, 61, 61a . . . judgment parts, and 62 . . . priority order change part.

BEST MODE FOR CARRYING OUT THE INVENTION

First Embodiment

Below, a mobile terminal 100 constituting a first embodiment of an electronic device of the present invention will be explained.

Figure 1:
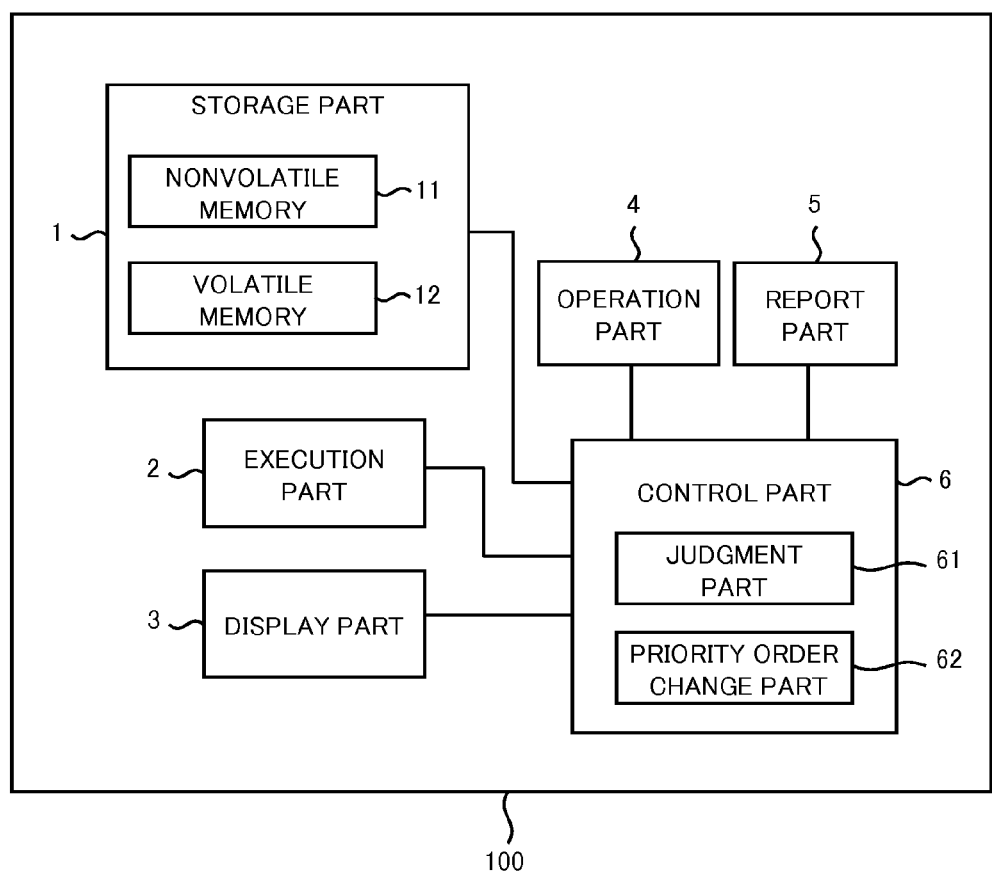
FIG. 1 is a block diagram showing an example of the configuration of a mobile terminal of a first embodiment.

FIG. 1 shows an example of the configuration of the mobile terminal 100.

As shown in FIG. 1, the mobile terminal 100 has a storage part 1, execution part 2, display part 3, operation part 4, report part 5, and control part 6.

The storage part 1 stores various types of data concerning the operation of the mobile terminal 100.

The storage part 1 has a nonvolatile memory 11 and a volatile memory 12.

The nonvolatile memory 11 is a memory which can be rewritten and does not lose data even when a power supply is turned off and is configured by, for example, a flash memory. The nonvolatile memory 11 stores programs of various types of applications operating on the mobile terminal 100. The applications stored in the nonvolatile memory 11 are, for example, a music application, TV application, radio application (corresponding to broadcast applications of the present invention), position information acquisition application, e-mail application, web browser application, game application, and function setting application.

The music application is an application for playing back music data stored in the nonvolatile memory 11 and outputting it from an audio output part not shown in FIG. 1.

The TV application and radio application are applications for reproducing a TV broadcast signal or radio broadcast signal received at an antenna not shown in FIG. 1 and making the display part 3 display images of the TV broadcast or making the audio output part output audio of the TV broadcast or radio broadcast from this in accordance with the former.

The position information acquisition application is an application for making, for example, a not shown GPS (global positioning system) reception part communicate with a GPS satellite to acquire the present position information of the location of the mobile terminal 100 at present or display the acquired present position on a map.

The e-mail application is an application having an e-mail preparation function of preparing e-mails and wirelessly communicating with a mail server through, for example, a communication part not shown in FIG. 1 and transmitting/receiving e-mails.

The web browser application is an application for wirelessly communicating with various types of web servers through the communication part, downloading web page data, and making the display part 3 display this web page.

The game application is an application for executing a game program.

The function setting application is an application for setting, for example, functions of the mobile terminal 100, for example, setting wallpaper displayed on the display part 3 in a standby state of the mobile terminal 100 or setting an incoming call sound for reporting when audio speech is received (for example setting the volume of the incoming sound).

Further, the nonvolatile memory 11 has information concerning the order of priority when executing these applications, that is, priority order information. The priority order information will be explained later.

The volatile memory 12 is a memory for temporarily storing a program or data used at the time of executing each application explained above. The temporarily stored program and data are erased under the control of the control part 6 when executing of the application terminates.

Further, the volatile memory 12 has a predetermined maximum memory capacity. For each application explained above, a memory capacity on the volatile memory 12 required for executing the application is determined. The total of the memory capacities used by the applications being ru executed n is prevented from exceeding the maximum memory capacity of the volatile memory 12.

Note that, the memory capacity of the volatile memory 12 corresponds to an example of the parameter of the present invention, while the maximum memory capacity corresponds to the permissible value of the present invention.

The execution part 2 executes an application requested to be executed by an operation etc. by a user of the operation part 4 or the like explained later among the various types of applications stored in the nonvolatile memory 11 explained above.

Further, the execution part 2 can interrupt an application being executed and newly execute another application when the above various types of applications are being executed. Further, it is also possible to end the application being executed.

Specifically, for example, when startup of the e-mail application is requested by an operation of the user during executing of the music application, the execution part 2 temporarily interrupts the music application and executes the e-mail application.

Note, even during interruption of an application, the interrupted application continues to be executed by the execution part 2. Namely, the state where an application is interrupted is just a state where the application is executed in the background and is not a state where an execution processing itself is suspended. For this reason, the interrupted application requires a memory capacity of the same extent as that when executing it on the volatile memory 12.

Accordingly, the execution part 2 must prevent the total of the memory capacities required for applications being interrupted or being executed from exceeding the maximum memory capacity of the volatile memory 12. For this reason, when an application needing, for executing, a memory capacity larger than the remaining memory capacity obtained by subtracting the memory capacities used by applications being interrupted or being executed from the maximum memory capacity of the volatile memory 12 is newly requested to be executed, the execution part 2 cannot execute the application newly requested to be executed unless any of the applications being interrupted or being executed is ended. Accordingly, in this case, the execution part 2 terminates any of the applications being interrupted or being executed. Which of the applications being interrupted or being executed is to be ended by the execution part 2 is determined according to the priority order information stored in the nonvolatile memory 11 explained above.

Note that, terminating of the application explained above, unlike interruption, means complete terminating of the execution processing of that application. Namely, the memory capacity of the volatile memory 12 used during executing of the application to be ended is released.

The priority order information is information concerning the order of priority of executing of various types of applications stored in the nonvolatile memory 11. The execution part 2 terminates the execution of the application having the lowest priority among applications being interrupted or being executed and executes a new application. Further, the priority order of the priority order information can be automatically set (assigned) and stored according to a judgment criteria which will be explained later. The priority order is set (assigned) by a priority order change part 62 of the control part 6. The method of setting the priority order carried out by the priority order change part 62 will be explained later.

The display part 3 is an LCD (liquid crystal display) or organic EL (electroluminescence) display or other display device and displays a screen relating to operation in accordance with various types of operations of the mobile terminal 100. For example, the display part displays information of the destination at the time of sending audio speech and displays information of an origin at the time of reception. Further, the display part displays a screen corresponding to each application when the execution part 2 executes various types of applications.

The operation part 4 is an input device, for example, tenkeys and a cross key. It accepts the input of the user at the time of various types of operations of the mobile terminal 100. Further, the operation part 4 may be a touch sensor etc. arranged so that it is superimposed on, for example, the display part 3.

The report part 5 reports events to the user by a variety of means, for example, a vibrator, alarm, and light emission. Note that the reporting means of the report part 5 is not limited in the present invention.

The control part 6 is a central processing unit centrally controlling the mobile terminal 100. Namely, at the time of various types of operations of the mobile terminal 100, the control part controls the components of the mobile terminal 100 explained above, that is, the nonvolatile memory 11, volatile memory 12, execution part 2, display part 3, operation part 4, and report part 5, and executes processing making these perform those operations.

Further, the control part 6 has a judgment part 61. When the execution part 2 is going to execute a new application during executing or interruption of at least one application, it judges whether the remaining memory capacity of the volatile memory 12 is larger or smaller than the memory capacity required by the application to be newly executed. In other words, when trying to secure a memory capacity required for executing an application newly requested to be executed on the volatile memory 12, the judgment part 61 judges whether or not it exceeds the maximum memory capacity (permissible value) of the volatile memory. Due to this, it is possible to judge whether or not a new application can be executed without terminating any application among applications being executed or being interrupted.

Further, the control part 6 has the priority order change part 62, changes the priority order of the priority order information of the nonvolatile memory 11 in accordance with an operation etc. of the user through the operation part 4, and makes the nonvolatile memory 11 store the priority order information having a new priority order. Note that, the priority order change part 62 can ignore the priority order stored in the nonvolatile memory 11 and determine a new priority order and can overwrite that new priority order in the nonvolatile memory 11 as new priority order information.

Figure 2:
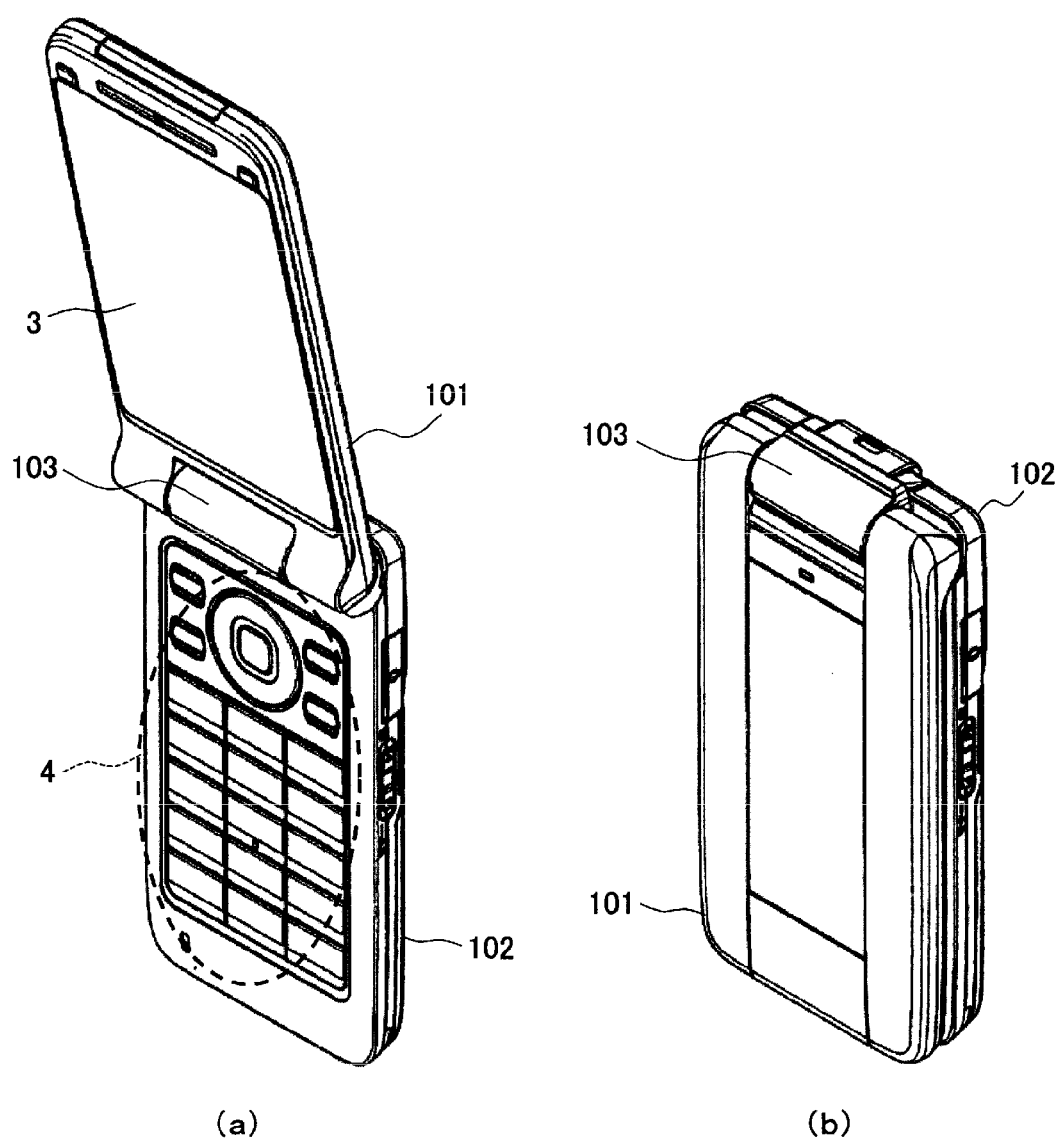
FIG. 2 is a diagram showing an example of an outer appearance of the mobile terminal of the first embodiment.

FIG. 2 is a diagram showing an example of an outer appearance of the mobile terminal 100.

As shown in FIG. 2, the mobile terminal 100 is formed by an upper case 101 and a lower case 102 which are connected to each other by a hinge part 103 so that it can be opened/closed.

FIG. 2(a) shows a state where the housing of the mobile terminal 100 is opened, and FIG. 2(b) shows a state where the housing of the mobile terminal 100 is closed.

The upper case 101 has the display part 3.

The lower case 102 has a tenkey, a cross key, and other operation part 4.

Next, the judgment criteria when setting the priority order concerning the priority order information will be explained.

Below, assume that, for example, the above music application, TV application, radio application, position information acquisition application, e-mail application, web browser application, game application, and function setting application are stored in the nonvolatile memory 11 as applications executable by the execution part 2.

(1) Judgment Criteria 1

The nonvolatile memory 11 sets the priority order of an application having a history function lower than the priority order of an application not having the history function.

The history function is a function capable of retaining history information of processing execution before terminating in the nonvolatile memory 11 when the application terminates and returning to the state before the terminating based on that history information when that application is executed again. For example, the web browser application has a history function retaining URL (uniform resource locator) information of a web page which was downloaded or the like and was displayed on the display part 3 in the past as the history information in the nonvolatile memory 11 and displaying that web page which was displayed on the display part 3 in the past on the display part 3 again based on that history information.

(2) Judgment Criteria 2

The nonvolatile memory 11 sets the priority order of an application having a cache function lower than the priority order of an application not having a cache function.

The cache function is a function retaining information concerning the operation state (execution state) at the time of terminating as a cache in the volatile memory 12 when the application terminates and capable of returning to the operation state before the terminating based on the cache when that application is executed again.

Among the above applications, the e-mail application, web browser application, game application, and function setting application have cache functions.

(3) Judgment Criteria 3

The nonvolatile memory 11 sets the priority order of an application having a favorite function lower than the priority order of an application not having a favorite function.

The favorite function is a function storing and preparing information required for setting the application to a predetermined operation state (execution state) in the nonvolatile memory 11 in advance. It becomes possible to enter that predetermined operation state by utilizing this information.

Among the above applications, the web browser function has a favorite function.

The applications shown by the judgment criteria 1 to 3 explained above are applications having functions enabling the operation states before terminating to be easily returned to when the applications are executed again after terminating. Namely, the judgment criteria 1 to 3 are set with the intent of setting low the priority order of an application which can easily be returned to the operation state before terminating at the time of re-executing even when it is once ended in a case where a plurality of applications are being executed.

(4) Judgment Criteria 4

For the music application, during playback of music or during recording of music, the priority order of the music application is set high in comparison with other cases.

If the music application is ended during playback of music, the information concerning the music being played back by the music application is lost. When it is executed the next time, the playback of the music terminates up being started irrelevant to the state before terminating. Further, when the music application is ended during recording of music, the audio data in the middle of being recorded is erased, so serious damage will end up being given on the user.

Alternatively, music can continue to be played back or recorded even when the music application is in the interrupted state (that is, it is possible to shift the screen etc. of the display part 3 to the normal state such as the standby state or a running screen of another application and play back only music), so if ended, an uncomfortable feeling is sometimes given to the user who has been listening to or recording music in the interruption state of the music application.

In consideration of these facts, the judgment criteria 4 is set with the intent that the priority order of the music application is raised during playback or recording of music of the music application to thereby make it hard to terminate the music application.

(5) Judgment Criteria 5

For the TV application and radio application, during playback of TV (radio) or during recording of TV (radio), the priority order of the TV (radio) application is set high in comparison with other cases.

Even when the TV application is in the interrupted state, it is possible to continue to play back only audio of the TV broadcast or continuously record the TV broadcast (that is, it is possible to shift the screen etc. of the display part 3 to the normal state such as the standby state or a running screen of another application and play back only audio of the received TV broadcast or record the TV broadcast), so if ended, an uncomfortable feeling is sometimes given to the user who had been listening to the audio of the TV broadcast in the interruption state of the TV application. This is true for the radio application as well.

Further, when the TV (radio) application is ended during recording of a TV (radio) broadcast, the data of the TV (radio) broadcast in the middle of being recorded is erased or recorded in an incomplete state, so serious damage will end up being given on the user.

In consideration of these facts, the judgment criteria 5 is set with the intent of raising the priority order of the TV (radio) application during reproduction or during recording of TV (radio) of the TV (radio) application to thereby make it hard to end the TV (radio) application.

(6) Judgment Criteria 6

For the position information acquisition application, during acquisition of position information, the priority order of the position information acquisition application is set high in comparison with other cases other.

When the position information acquisition application is ended during acquisition of position information, the position information being acquired by the position information acquisition application is lost, so the position information must be re-acquired again at the time of the next execution.

In consideration of this, the judgment criteria 6 is set with the intent of raising the priority order of the position information acquisition application during acquisition of the position information by the position information acquisition application to thereby make it hard to end the position information acquisition application.

(7) Judgment Criteria 7

For the e-mail application, during preparation of an e-mail, the priority order of the e-mail application is set high in comparison with other cases other.

When the e-mail application is ended during preparation of an e-mail, information of the e-mail being prepared is lost, so the e-mail must be re-prepared again at the time of the next execution.

In consideration of these facts, the judgment criteria 7 is set with the intent of raising the priority order of the e-mail application during preparation of the e-mail by the e-mail application to thereby make it hard to end the e-mail application.

(8) Judgment Criteria 8

In accordance with the execution frequency of each application, the priority order of an application having a low execution frequency is set lower than the priority order of an application having a high execution frequency.

Due to this, the application which is frequently used by the user becomes hard to end, so the usage for the user is improved.

The nonvolatile memory 11 sets priority orders of all stored applications based on the judgment criteria as explained above and stores these as the priority order information.

Note that the format etc. of the priority order information are not limited in the present invention.

Below, an example of the operation in a case when requesting the execution of another application during executing of an application by the execution part 2 in the mobile terminal 100 of the present first embodiment will be explained.

Figure 3:
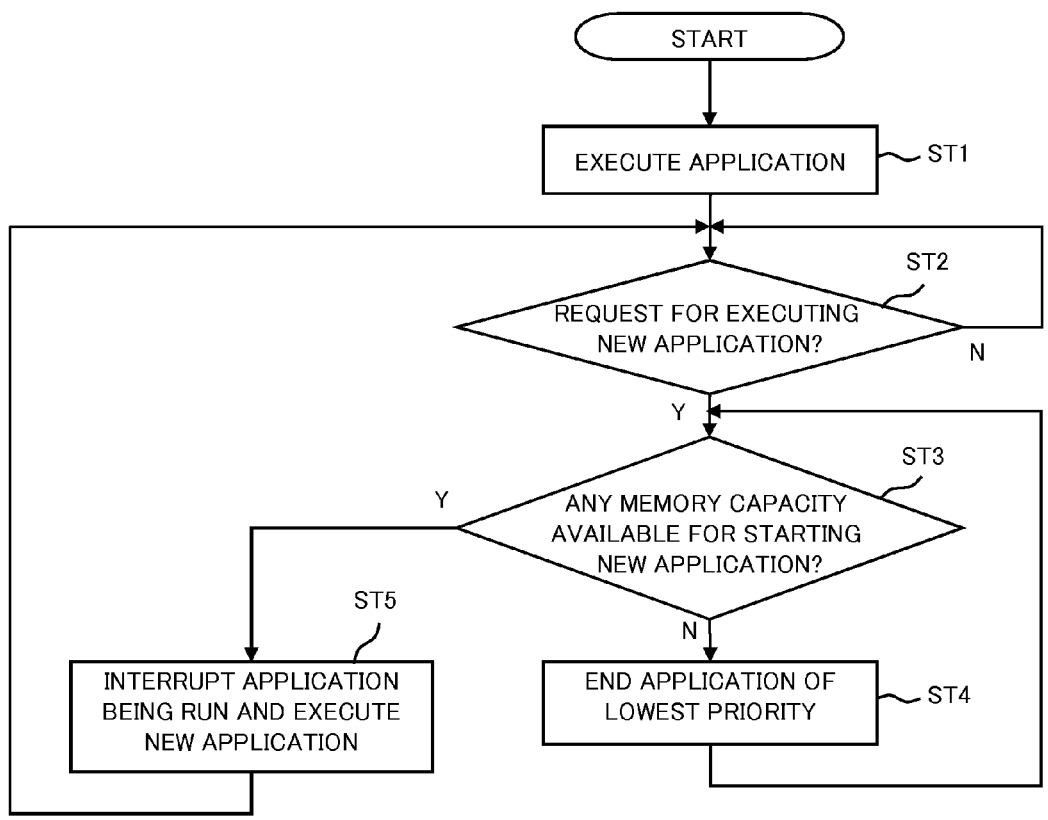
FIG. 3 is a flow chart for explaining an example of the operation when executing of another application is requested during executing of an application by an execution part in the mobile terminal of the first embodiment.

FIG. 3 is a flow chart for explaining an example of the operation when requesting the execution of another application during executing of an application by the execution part 2.

Step ST1

The execution part 2 starts an execution an application stored in the nonvolatile memory 11 in accordance with an operation etc. of the user through the operation part 4.

Step ST2

By the operation etc. of the user through the operation part 4, when executing of an application is newly requested in a state where the application is executed at step ST1 is being executed, the routine proceeds to step ST3, while when it is not requested, it returns to step ST2.

Step ST3

When the judgment part 61 judges that the memory capacity required for executing the new application requested to be executed at step ST2 remains in the volatile memory 12, the routine proceeds to step ST6, while when judging that the memory capacity does not remain, the routine proceeds to step ST4.

Step ST4

The execution part 2 terminates the application having the lowest priority of the priority order information stored in the nonvolatile memory 11 among applications which have been executed before step ST2 and returns to step ST3.

Step ST5

The execution part 2 interrupts the application which has been executed before step ST2, executes the application newly requested to be executed at step ST2, and returns to step ST2.

As explained above, according to the mobile terminal 100 of the present first embodiment, the execution part 2 executes the new application after terminating the application having the lowest priority among applications being executed or being interrupted according to priority orders of the priority order information in the nonvolatile memory 11 in the case when requesting the execution of a new application when there are applications being executed or being interrupted and the judgment part 61 judges that the memory capacity required for executing the new application does not remain in the volatile memory 12. Therefore, it becomes unnecessary for the user himself to determine which application among applications being executed or being interrupted to end to execute the new application, so the operability of the mobile terminal 100 is improved.

Note that, which application is to be ended with the highest priority in a case where there are a plurality of applications having the highest priority is not limited in the present invention. For example, an application selected at random may be ended or more detailed priority orders may be set in advance and an application determined according to these may be ended.

Further, in the first embodiment explained above, as an example of the predetermined parameter of the present invention, the memory capacity required at the time of executing each application was mentioned. However, the present invention is not limited to this. Namely, for example, as the predetermined parameter, it is also possible to use the number of applications being executed or being interrupted. In this case, when the number of applications being executed or being interrupted exceeds four, the application having the lowest priority may be ended.

Further, in the first embodiment explained above, the priority orders of the priority order information stored in the nonvolatile memory 11 are not necessarily set by the method of setting according to the judgment criteria explained above. Namely, for example, the nonvolatile memory 11 may set the priority order of an application having a long duration from the start of the executing low and make the execution part 2 end the application being executed (interrupted) for the longest time with the highest priority.

Second Embodiment

Below, a mobile terminal 200 of a second embodiment of an electronic device of the present invention will be explained.

Figure 4:
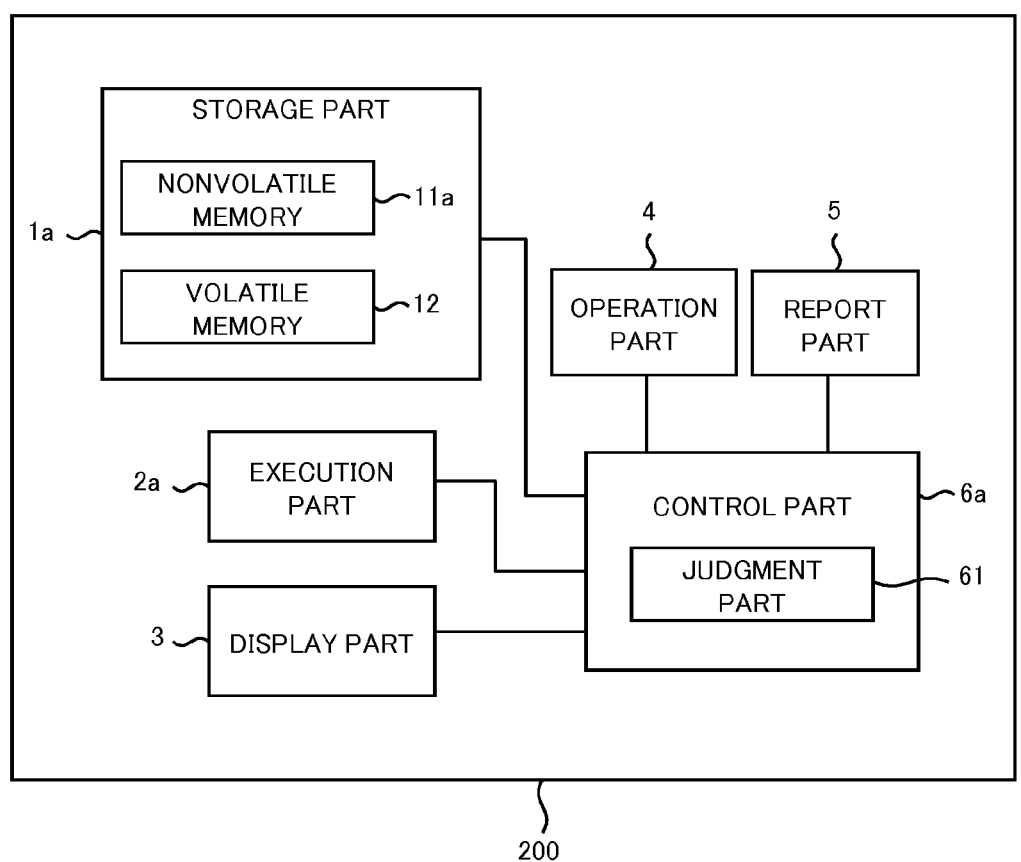
FIG. 4 is a block diagram showing an example of the configuration of a mobile terminal of a second embodiment.

FIG. 4 is a block diagram showing an example of the configuration of the mobile terminal 200 of the second embodiment.

As shown in FIG. 4, the mobile terminal 200 has a storage part 1a, execution part 2a, display part 3, operation part 4, report part 5, and control part 6a.

As shown in FIG. 4, the mobile terminal 200 of the second embodiment has the same configuration as that of the mobile terminal 100 of the first embodiment. Below, the configurations of the mobile terminal 200 will be explained mainly focusing on the difference from the mobile terminal 100 of the first embodiment. Accordingly, components performing the same operations as those in the first embodiment are given the same notations, and explanations will be omitted.

The storage part 1a stores various types of data concerning the operation of the mobile terminal 200.

The storage part 1a has a nonvolatile memory 11a and volatile memory 12.

The nonvolatile memory 11a stores programs of various types of applications operating on the mobile terminal 200 in the same way as the nonvolatile memory 11 of the first embodiment.

Further, the nonvolatile memory 11a stores end-prohibited application information as information concerning any application which is not to be ended unless authorized by the user. The end-prohibited application information will be explained later.

The execution part 2a executes an application requested to be executed by an operation etc. of the user through the operation part 4 etc. explained later among various types of applications stored in the nonvolatile memory 11a explained above in the same way as the execution part 2 of the first embodiment.

Further, the execution part 2a can interrupt an application being executed and newly executes another application when executing the above various types of applications in the same way as the execution part 2 of the first embodiment. Further, it is also possible to end an application being executed.

Further, in the same way as the execution part 2 of the first embodiment, the execution part 2a must prevent the total of the memory capacities required for applications being interrupted or being executed from exceeding the maximum memory capacity of the volatile memory 12. When an application requiring a memory capacity for executing which is larger than the remaining memory capacity obtained by subtracting the memory capacities used by the applications being interrupted or being executed from the maximum memory capacity of the volatile memory 12 is newly requested to be executed, the execution part 2a executes the new application requested to be executed after terminating any of the applications being interrupted or being executed.

Here, unlike the execution part 2 of the first embodiment, it is determined according to the end-prohibited application information stored by the nonvolatile memory 11a explained above which application among the applications being interrupted or being executed to end by the execution part 2a.

The end-prohibited application information is information concerning any application which is never to be ended by the execution part 2a (application for which restriction of end of executing is set, hereinafter, referred to as an "end-prohibited application").

Note that, the method of determining which application to end from executing or interruption among applications other than the end-prohibited applications is not limited in the present invention. For example, the execution part 2a may determine an application to be ended at random from among applications other than the end-prohibited applications, determine the application to be ended based on priority orders of the applications which are determined in advance, or determine the application having the oldest point of start of executing as the application to be ended. Note that, this determination may be made for a plurality of applications as well.

The method of setting the end-prohibited application information will be explained later.

The control part 6a is a central processing unit for centrally controlling the mobile terminal 200 in the same way as the control part 6 of the first embodiment and has a judgment part 61 performing the same operation as that in the first embodiment. Namely, the control part 6a of the second embodiment is different from the control part 6 of the first embodiment in the point that it does not have the priority order change part 62 of the first embodiment.

Next, the method of setting the end-prohibited application information stored in the nonvolatile memory 11a will be explained.

As a first method, there can be mentioned a method of setting end-prohibited applications by an operation of the user through the operation part 4.

Namely, the user sets end-prohibited applications through the operation part 4. The end-prohibited application information including the information concerning the set end-prohibited applications is stored by the nonvolatile memory 11a. In the case where the judgment part 61 judges that the execution of a new application needing a memory capacity larger than the remaining memory capacity is requested during executing or during interruption of at least one application, under the control of the control part 6a, the execution part 2a determines the application to be ended from among the applications other than the end-prohibited applications among applications being executed or being interrupted and executes this execution-requested application after terminating the determined application.

A concrete example will be given.

For example, assume that the e-mail application is set in advance by the user as an end-prohibited application.

At this time, assume that executing of the web browser application is requested in a state where the e-mail application is being executed. Further, assume that the remaining memory capacity of the volatile memory 12 in this case is larger than the memory capacity required by the web browser application. In this case, the web browser application is executed, and the execution of the e-mail application is interrupted.

Next, assume that a request for executing the music application is newly input by the user through the operation part 4 etc. Further, assume that the remaining memory capacity of the volatile memory 12 in this state is smaller than the memory capacity required by the music application. In this case, since the terminating of the e-mail application is prohibited, the execution part 2a terminates the web browser application. Due to this, when the judgment part 61 judges that the remaining memory capacity of the volatile memory 12 becomes larger than the memory capacity required for the execution of the music application, the execution part 2a newly executes the music application.

Note that, as in the example explained above, for example, a specific application may be set as the end-prohibited application before executing of a specific application, but even if not doing this, for example, at the time of the request for executing of a specific application through the operation part 4 or during executing of that, this specific application may be set as the end-prohibited application. Further, in this case, the user can easily perform this setting by, for example, depression of a predetermined button of the operation part 4. Further, a once set end-prohibited application may be released in response to an operation of the user through the operation part 4.

Next, as a second method, when a specific application is performing a specific operation, there can be mentioned a method of setting the specific application during operation as the end-prohibited application by the control part 6a.

Namely, when the application which is already being executed is performing a specific operation, the control part 6a sets that application as the end-prohibited application and prevents the terminating of that application.

A concrete example will be given.

For example, assume that the music playback function or music recording function is being operated during executing of a music application. In this case, when the music application is forcibly ended by the execution part 2a along with executing of a new application, a strong uncomfortable feeling is liable to be given to the user who had been enjoying playback of the music or recorded data is lost and cannot be recovered when the music is being recorded. Therefore, even if the music playback function was not set as the previously explained end-prohibited application, the control part 6a automatically sets the music application as the end-prohibited application during playback of the music or during recording of the music and thereby prevents the execution part 2a from terminating the music application even in a case where the execution of a new application is requested when the music application and another application are being executed or being interrupted. Namely, in this case, the music playback function or music recording function of the music application corresponds to the specific operation explained above. Note, in a state where neither the music playback function nor the music recording function are operating during executing of the music application, for example, in a state where only an operation for selecting a tune to be played back or recorded is performed, it is presumed that a situation which cannot be recovered from, for example, a strong uncomfortable feeling being inflicted on the user, will not occur even when the operation is forcibly ended, therefore the music application is not automatically set as the end-prohibited application.

Note that, the application which is automatically set by the control part 6a as the end-prohibited application during the specific operation is not limited to the music application. Below, a concrete example thereof will be given.

For example, in the TV application and radio application (the broadcast application of the present invention), in the same way as the music application, when it is forcibly ended during reception of a broadcast (during broadcast reproduction function operation) or during broadcast recording (during broadcast recording function operation), a strong uncomfortable feeling is given to the user. For this reason, during broadcast reception and during broadcast recording, the control part 6a sets the TV application and radio application as the end-prohibited applications. In this case, the broadcast reception function and broadcast recording function correspond to the specific operations explained above.

Further, in the position information acquisition application, when it is forcibly ended during a position information acquisition operation, the present position is not acquired, but the position information acquisition processing terminates. In order to acquire the present position, it is necessary to execute the position information acquisition application again and perform the position information acquisition processing from the start, so this wastes time and memory resources. For this reason, during acquisition of the position information, the control part 6a sets the position information acquisition application as the end-prohibited application. In this case, the position information acquisition function corresponds to the specific operation explained above.

Further, in the e-mail application, when it is forcibly ended during operation of the mail preparation function for preparing e-mail, the information concerning the e-mail being prepared is lost, so an uncomfortable feeling is given to the user. For this reason, during operation of the e-mail preparation function, the control part 6a sets the e-mail application as the end-prohibited application. In this case, the e-mail preparation function corresponds to the specific operation explained above.

As explained above, the end-prohibited application information set by the methods as explained above are set for applications stored in the nonvolatile memory 11a.

Next, an example of the operation of the mobile terminal 200 of the present embodiment will be explained.

Figure 5:
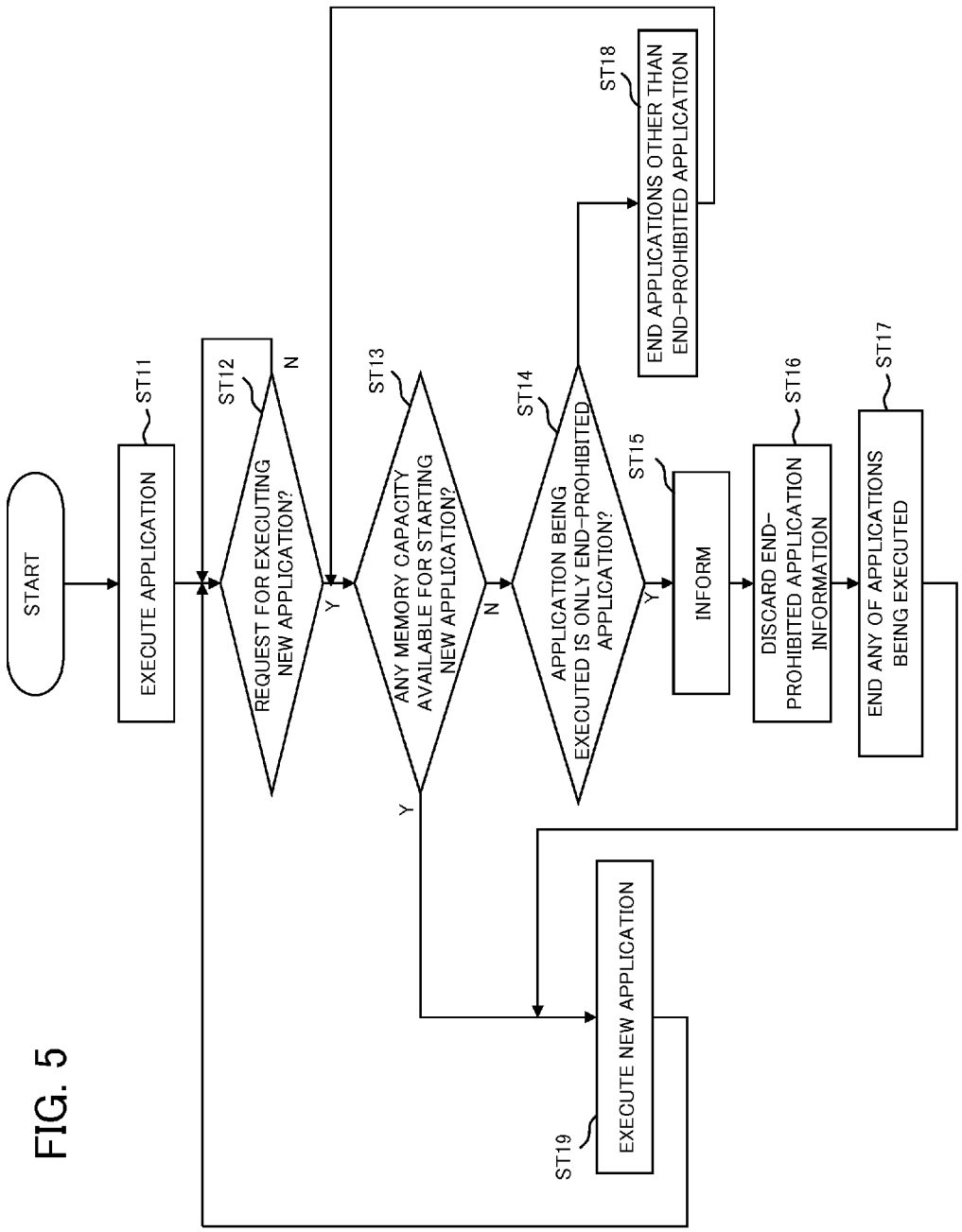
FIG. 5 is a flow chart for explaining an example of the operation when executing of another application is requested during executing of an application by the execution part in the mobile terminal of the second embodiment.

FIG. 5 shows a flow chart of that.

Step ST11

The execution part 2a starts the execution of an application stored in the nonvolatile memory 11a in response to an operation etc. of the user through the operation part 4.

Step ST12

The routine proceeds to step ST13 where the execution of a new application is requested by an operation etc. of the user through the operation part 4 in a state where the application started to be executed at step ST11 is being executed, while repeats step ST12 where the execution is not requested.

Step ST13

The judgment part 61 judges whether or not a memory capacity required for executing the new application requested to be executed at step ST12 remains in the volatile memory 12, proceeds to step ST19 when judging that it remains, while proceeds to step ST14 when judging that it does not remain.

Step ST14

The control part 6a judges whether or not all applications being executed at step ST11 or the application which is newly executed or interrupted at step ST19 as will be explained later are applications included in the end-prohibited application information of the nonvolatile memory 11a, proceeds to step ST15 when all of the applications being executed or being interrupted are applications included in the end-prohibited application information, while proceeds to step ST18 where even one application is an application which is not included in the end-prohibited application information.

Step ST15

Since it is judged at step ST14 that all of the applications being executed or being interrupted are applications included in the end-prohibited application information, the report part 5 informs this fact to the user.

Step ST16

The control part 6a discards the end-prohibited application information of the nonvolatile memory 11a (releases the setting whereby terminating of executing of one of the applications is restricted) since it is informed at step ST15 that all of applications being executed or being interrupted are applications included in the end-prohibited application information.

Step ST17

The execution part 2a terminates at least one of the applications being executed or being interrupted and proceeds to step ST19.

Step ST18

The control part 6a terminates at least one of the applications which are not included in the end-prohibited application information among applications being executed or being interrupted and returns to step ST13.

Step ST19

The execution part 2a starts the execution of a new application and interrupts the application being executed at that time since it is judged at step ST13 by the judgment part 61 that the remaining memory amount of the volatile memory 12 is larger than the memory amount required by the application to be newly executed.

As explained above, according to the mobile terminal 200 of the present second embodiment, when executing of a new application is requested when there is an application being executed or being interrupted, but the judgment part 61 judges that the memory capacity required for executing the new application does not remain in the volatile memory 12, the execution part 2a refers to the end-prohibited application information in the nonvolatile memory 11a and terminates an application being executed or being interrupted other than the end-prohibited application, therefore it becomes unnecessary for the user himself to determine which application among applications being executed or being interrupted to end to execute the new application, so the operability of the mobile terminal 200 is improved.

Note that, in the second embodiment explained above, which application to end when there are a plurality of applications being executed or being interrupted other than the end-prohibited applications is not limited in the present invention. For example, an application selected at random may be ended or detailed priority orders may be set in advance as in the first embodiment and the application determined according to these ended.

Further, in the second embodiment explained above, as an example of the predetermined parameter of the present invention, the memory capacity required at the time of executing of each application was mentioned, but the present invention is not limited to this. Namely, for example, it is also possible to set the number of applications being executed or being interrupted as the predetermined parameter. In this case, for example, when the number of applications being executed or being interrupted exceeds four, applications other than the end-prohibited applications may be ended.

The present invention is not limited to the first and second embodiments explained above.

Namely, when performing the present invention, various modifications, combinations, sub-combinations, and alterations may occur for components of the embodiments explained above insofar as they are within the scope of the appended claims or the equivalents of the present invention.

In the embodiments explained above, as an example of the predetermined parameter of the present invention, the memory capacity required at the time of the execution of each application was mentioned, but the present invention is not limited to this. Namely, for example, it is also possible to set the number of applications being executed or being interrupted as the predetermined parameter. In this case, for example, when the number of applications being executed or being interrupted exceeds four, an application selected at random or the application having the lowest priority may be ended.

INDUSTRIAL APPLICABILITY

The invention can be utilized as an electronic device capable of executing a plurality of applications, and a control method in such an electronic device.

The invention claimed is:

1. An electronic device comprising:
a storage part configured to store a plurality of applications to which an order of priority is initially assigned, wherein if one of the plurality of applications is an application having a function that is capable of retaining operation state information and returning the application to a previous operation state, the storage part stores the priority order of the application having the function lower than priority order of an application not having the function;
an execution part configured to execute an application requested to be executed from among the plurality of applications stored in the storage part; and
a control part configured to control the execution of the application executed by the execution part,
wherein the control part dynamically determines whether an amount of information to be stored in the storage part would exceed a predetermined permissible value if the application requested to be executed is to be executed, and
upon determining that the amount of information to be stored would exceed the predetermined permissible value, terminates the execution of an application having a lowest priority among one or more applications currently being executed by the execution part, in order to execute the application requested to be executed, wherein the application having the lowest priority is an application having the function that is capable of retaining operation state information and returning the application to a previous operation state.

2. The electronic device as set forth in claim 1, wherein:
the storage part comprises a nonvolatile memory storing the plurality of applications to which the order or priority is initially assigned, and a volatile memory storing information required for executing the one or more applications currently being executed and the application requested to be executed by the execution part; and
wherein the amount of information to be stored represents information to be stored in the volatile memory required for the execution of the application requested to be executed.

3. The electronic device as set forth in claim 1, wherein:
the function is a history function.

4. The electronic device as set forth in claim 1, wherein:
the function is a cache function.

5. The electronic device as set forth in claim 1, wherein:
the function is a favorite function.

6. The electronic device as set forth in claim 1, wherein:
the control part dynamically changes the priority order in accordance with the execution frequencies of the plurality of applications.

7. The electronic device as set forth in claim 1, wherein:
the electronic device further comprises an operation part; and
the control part changes the priority order of the plurality of applications in response to an input operation performed by a user using the operation part.

8. The electronic device as set forth in claim 1, wherein:
the control part changes the priority order of the plurality of applications, when an application of the plurality of applications starts to execute by the execution part, or during the execution of the application by the execution part.

9. An electronic device comprising:
a storage part configured to store a plurality of applications to which an order of priority is initially assigned, wherein if one of the plurality of applications is an application having a function that is capable of retaining operation state information and returning the application to a previous operation state, the storage part stores the priority order of the application having the function lower than priority order of an application not having the function;
an execution part configured to execute an application requested to be executed from among the plurality of applications stored in the storage part; and
a control part configured to control the execution of the application executed by the execution part,
wherein the control part dynamically determines whether an amount of information to be stored in the storage part would exceed a predetermined permissible value if the application requested to be executed is to be executed, and
upon determining that the amount of information to be stored would exceed the predetermined permissible value, terminates the execution of an application having a lowest priority among one or more applications currently being executed by the execution part, in order to execute the application requested to be executed, wherein the application being terminated is other than a specific application prohibited from being terminated, wherein termination of the specific application would cause a loss of information due to the specific application not having the function that is capable of retaining operation state information and returning the application to a previous operation state.

10. The electronic device as set forth in claim 9, wherein:
the storage part comprises a nonvolatile memory storing the plurality of applications, and a volatile memory storing information required for executing the one or more applications currently being executed and the application requested to be executed by the execution part; and
wherein the amount of information to be stored represents information to be stored in the volatile memory.

11. The electronic device as set forth in claim 9, wherein:
the specific application prohibited from being terminated is a music application having music recording function or music playback function, when the music application is currently being executed by the execution part, and the music recording function or music playback function is currently being operated.

12. The electronic device as set forth in claim 9, wherein:
the specific application prohibited from being terminated is a broadcast application having a broadcast recording function or a broadcast reproduction function, when the broadcast application is currently being executed by the execution part, and the broadcast recording function or broadcast reproduction function is currently being operated.

13. The electronic device as set forth in claim 9, wherein: the specific application prohibited from being terminated is a position information application having a position acquiring function, when the position information application is currently being executed by the execution part, and the position acquiring function is currently being operated.

14. The electronic device as set forth in claim 9, wherein: the specific application prohibited from being terminated is an e-mail application having an e-mail preparation function, when the e-mail application is currently being executed by the execution part, and the e-mail preparation function is currently being operated.

15. The electronic device as set forth in claim 9, wherein: the control part automatically sets the specific application prohibited from being terminated, when the specific application starts to execute by the execution part, or during the execution of the specific application by the execution part.

16. The electronic device as set forth in claim 9, wherein: the electronic device further comprises a report part; and the control part informs a user using the report part, upon determining that the amount of information to be stored would exceed the predetermined permissible value, and all of the one or more applications currently being executed by the execution part are specific applications prohibited from being terminated.

17. The electronic device as set forth in claim 16, wherein: the control part releases any setting prohibiting the termination of the one or more applications currently being executed by the execution part.

18. A computer-implemented method of controlling an electronic device capable of executing a plurality of applications, including:
   assigning an initial priority order to the plurality of applications stored on the electronic device, wherein if one of the plurality of applications is an application having a function that is capable of retaining operation state information and returning the application to a previous operation state, assigning the application having the function a priority lower than the priority of an application not having the function;
   determining whether an amount of information to be stored in the electronic device will exceed a predetermined permissible value when a new application is requested to be executed among one or more applications currently being executed on the electronic device; and
   upon determining that the amount of information to be stored will exceed the predetermined permissible value resulting from the execution of the new application, terminating the execution of an application having a lowest priority among the one or more applications currently being executed, in order to execute the application requested to be executed, wherein the application having the lowest priority is an application having the function that is capable of retaining operation state information and returning the application to a previous operation state.

19. A computer-implemented method of controlling an electronic device capable of executing a plurality of applications, including:
   assigning an initial priority order to the plurality applications stored on the electronic device, wherein if one of the plurality of applications is an application having a function that is capable of retaining operation state information and returning the application to a previous operation state, assigning the application having the function a priority lower than the priority of an application not having the function;
   determining whether an amount of information to be stored in the electronic device will exceed a predetermined permissible value when a new application is requested to be executed among one or more applications currently being executed on the electronic device; and
   upon determining that the amount of information to be stored will exceed the predetermined permissible value resulting from the execution of the new application, terminating the execution of an application having a lowest priority among the one or more applications currently being executed, in order to execute the application requested to be executed, wherein the application being terminated is other than a specific application prohibited from being terminated, wherein termination of the specific application would cause a loss of information due to the specific application not having the function that is capable of retaining operation state information and returning the application to a previous operation state.

* * * * *

UNITED STATES PATENT AND TRADEMARK OFFICE
CERTIFICATE OF CORRECTION

| | | |
|---|---|---|
| PATENT NO. | : 8,631,413 B2 | Page 1 of 1 |
| APPLICATION NO. | : 12/524717 | |
| DATED | : January 14, 2014 | |
| INVENTOR(S) | : Yuki Wada | |

It is certified that error appears in the above-identified patent and that said Letters Patent is hereby corrected as shown below:

On the Title page, Item (54) and in the Specification, Col. 1, Line 1-4, delete "DETERMINING THE TERMINATION PRIORITY OF APPLICATIONS BASED ON CAPABILITY OF APPLICATIONS TO RETAIN OPERATION STATE INFORMATION" and insert therefor --ELECTRONIC DEVICE AND ELECTRONIC DEVICE CONTROL METHOD--

Signed and Sealed this
Twenty-second Day of April, 2014

Michelle K. Lee
*Deputy Director of the United States Patent and Trademark Office*